S. R. SHELDON.
CONTROL FOR SPRAY HEADS FOR AIR WASHERS.
APPLICATION FILED JULY 30, 1912.

1,057,781.

Patented Apr. 1, 1913.

2 SHEETS—SHEET 1.

WITNESSES

INVENTOR
S. R. SHELDON

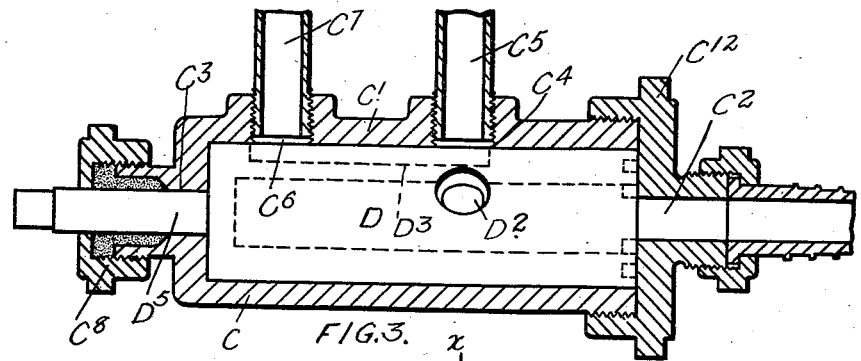
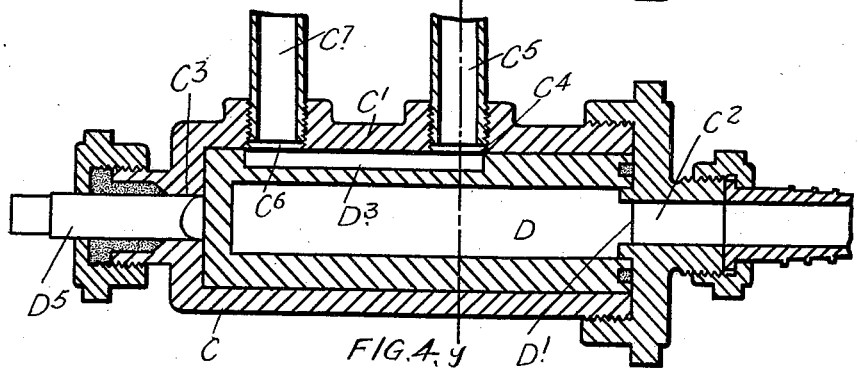
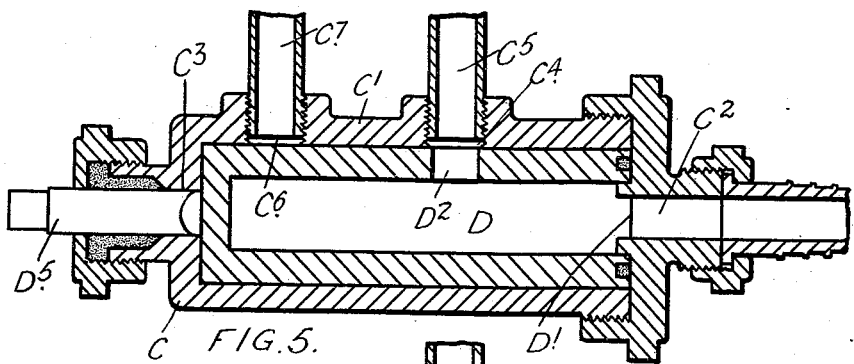
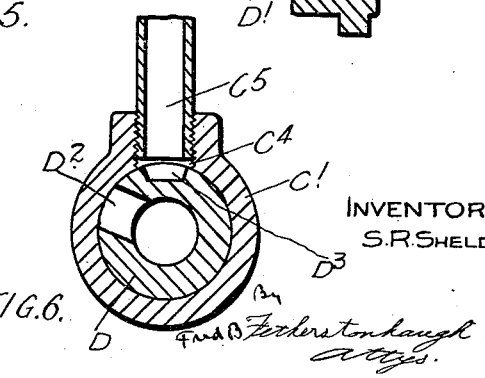

UNITED STATES PATENT OFFICE.

SIDNEY RANDOLPH SHELDON, OF GALT, ONTARIO, CANADA.

CONTROL FOR SPRAY-HEADS FOR AIR-WASHERS.

1,057,781. Specification of Letters Patent. Patented Apr. 1, 1913.

Application filed July 30, 1912. Serial No. 712,345.

*To all whom it may concern:*

Be it known that I, SIDNEY RANDOLPH SHELDON, of the town of Galt, in the county of Waterloo, in the Province of Ontario, Canada, have invented certain new and useful Improvements in Controls for Spray-Heads for Air-Washers, of which the following is the specification.

My invention relates to improvements in controls for spray heads for air washers as disclosed in my companion application, Ser. No. 712,346, and the object of the invention is to provide a simple device for supplying water pressure to a spray head to operate the flushing mechanism thereof and to supply such water at predetermined intervals operated by the water falling from the spray heads and it consists essentially of a supporting frame, a valve comprising a cylindrical outer member provided with a pipe leading to the spray heads, and a stand pipe leading to the atmosphere above the spray heads, and an inlet pipe, and cylindrical inner member having an open end opposite to the inlet pipe of the outer cylindrical member, a peripheral opening in circumferential alinement with the pipe opening leading to the spray heads, and a longitudinal passage for connecting the pipe opening leading to the spray heads with the stand pipe opening leading to the atmosphere when the valve is in its normal position, an operating spindle connected at the opposite end of the inner cylindrical member and extending through the outer cylindrical member, a tiltable pan swung upon a suitable support to one side of its center, a counterweight for the pan designed to hold the pan normally horizontal, and a link and lever connection between the overhanging portion of the pan and the operating spindle of the valve as hereinafter more particularly explained by the following specification.

Figure 1:
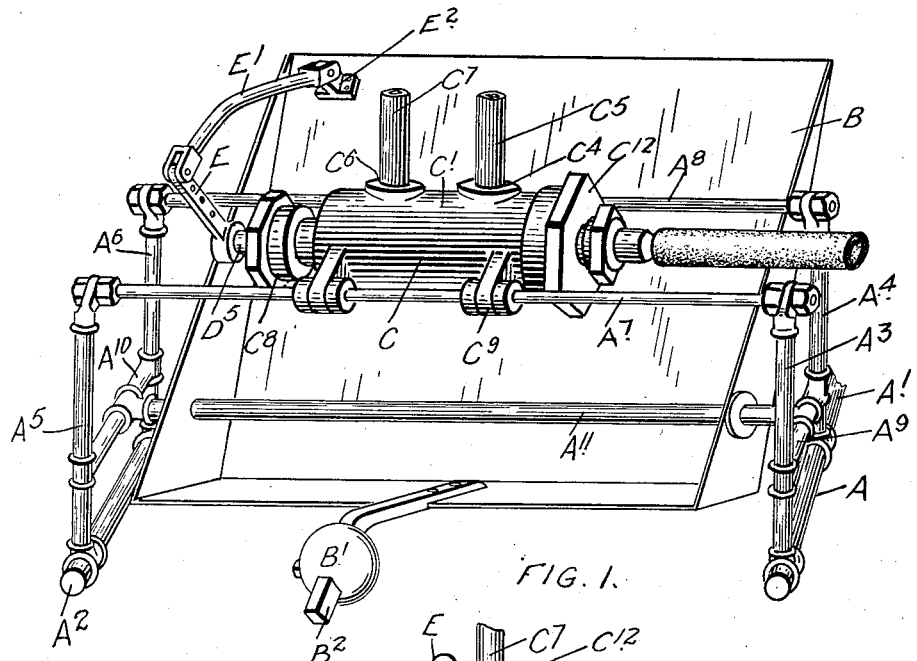
Figure 2:
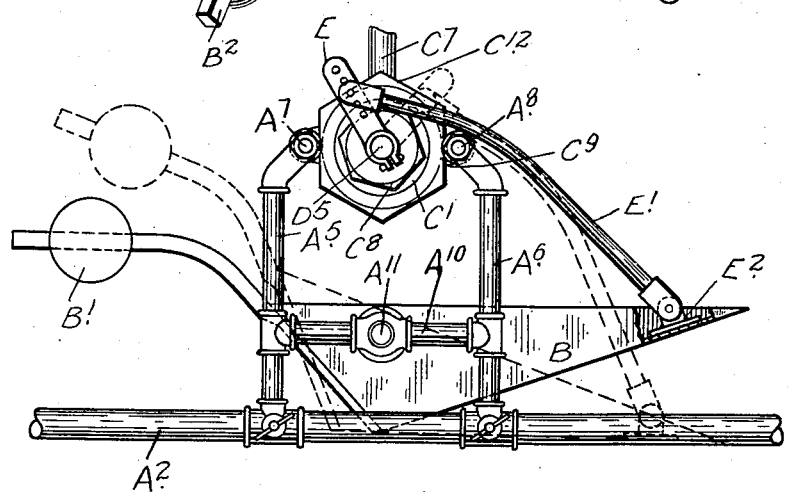

Figure 1, is a general perspective view of my control device. Fig. 2, is a side elevation of my control device. Fig. 3, is an enlarged sectional detail of the valve showing the inner cylindrical member thereof in full. Fig. 4, is a sectional view of the valve in its normal position. Fig. 5, is a similar view to Fig. 4 showing the valve in the position it would assume when supplying water to the spray heads. Fig. 6, is a cross section on line $x$—$y$ Fig. 4.

In the drawings like letters of reference indicate corresponding parts in each figure.

A is the supporting frame comprising the lower longitudinal members $A'$ and $A^2$, the vertical members $A^3$ and $A^4$ extending upwardly from the longitudinal member $A'$ and the vertical members $A^5$ and $A^6$ extending upwardly from the longitudinal member $A^2$.

$A^7$ is a longitudinal rod secured at its ends to the verticals $A^5$ and $A^3$, and $A^8$ is a similar rod secured at its ends to the verticals $A^4$ and $A^6$.

$A^9$ and $A^{10}$ are cross bars connecting the verticals $A^3$ and $A^4$ and the verticals $A^5$ and $A^6$ respectively.

$A^{11}$ is a longitudinal bearing rod connected at its ends to the cross bars $A^9$ and $A^{10}$.

B is a pan preferably triangular in cross section and swung at a point opposite its apex on the bearing bar $A^{11}$. It will thus be seen that a small portion of the pan at its deep end extends to one side of the bearing bar $A^{11}$ and the major portion of the pan extending toward the shallow end extends to the other side of the bar $A^{11}$.

$B'$ is a counterweight by which the pan B is normally held in a horizontal position. The counterweight $B'$ is supported by an arm $B^2$ secured to a suitable portion of the pan at its deep end.

C is a valve comprising an outer cylindrical casing $C'$ having an inlet orifice $C^2$ at one end thereof and a bearing orifice $C^3$ at the opposite end thereof. The periphery of the casing $C'$ is provided with an opening $C^4$ into which is threaded a pipe $C^5$ leading to the spray heads of an air washer and an opening $C^6$ provided with a pipe $C^7$ leading to the atmosphere.

D is the inner cylindrical member of the valve having an open end $D'$ opposite the inlet opening $C^2$ of the outer casing. The end of the casing $C'$ is provided with a closing cap $C^{12}$ in which the opening is located and which is preferably removable for the purpose of assembling the parts or for repair. The inner member D is provided with a peripheral opening D² circumferentially in alinement with the opening C⁴ leading to the spray heads and a longitudinal groove D³ connecting the opening C⁴ with the opening C⁶ when the valve is in its normal position.

The bearing opening C³ is preferably provided with a suitable stuffing box C⁸.

D⁵ is the operating spindle of the valve which extends into the closed end of the cylindrical inner member through the bearing opening C³ and the stuffing box C⁸.

E is an operating arm secured at one end to the spindle D⁵ and connected at its opposite end by a link E' to the shallow end of the pan B by a bracket E² to which the opposite end of the link is pivotally connected.

The outer casing C' of the valve is provided with supporting lugs C⁹ extending laterally from each side thereof and suitably secured to the rods A⁷ and A⁸.

Having described the principal parts involved in my invention I will briefly describe the operation of the same. In the normal position shown in Figs. 1, 2, 3, 4 and 6 the water contained in the pipe C⁵ leading to the spray heads passes through the groove D³ into the pipe C⁷ until it finds its own level. The pan B is gradually filled with water from any suitable source until the counterweight B' is overbalanced. The shallow end of the pan then falls into the dotted position indicated in Fig. 2 of the drawings drawing upon the link E' and arm E. This operation carries the opening E² into alinement with the opening C⁴. The water then passes through the inlet pipe, inner valve member D, opening D² into the opening C⁴ and pipe C⁵ leading to the spray heads. As soon as the pan B is emptied the counterweight acts to carry the pan back to its normal position and thus cary the valve to its normal position so that the pressure through the pipe C⁵ is relieved through the groove D⁵ and pipe C⁷.

It will thus be seen from this description that I have devised a very simple form of valve which is particularly adapted to the operation of spray heads and particularly to that form of spray heads in which it is required to convey water pressure to the heads at predetermined intervals and by which the pipe leading to the spray heads is maintained full of water when the valve is in the relief pressure position.

What I claim as my invention is—

1. In a control device for spray heads for air washers, a valve comprising an outer cylindrical member having a water inlet at one end, a peripheral opening, a spray head supply pipe secured in the opening, and a peripheral opening leading to the atmosphere, an inner cylindrical member open at the end in alinement with the inlet opening of the outer cylinder, a peripheral opening in circumferential alinement with the spray head pipe opening, and a longitudinal groove normally connecting the spray head pipe opening with the opening leading to the atmosphere, as and for the purpose specified.

2. In a control device for spray heads for air washers, a valve comprising an outer cylindrical member having a water inlet at one end, a peripheral opening, a spray head supply pipe secured in the opening, and a peripheral opening and pipe leading to the atmosphere, an inner cylindrical member open at the end in alinement with the inlet opening of the outer cylinder, a peripheral opening in circumferential alinement with the spray head pipe opening, and a longitudinal groove normally connecting the spray head pipe opening with the opening leading to the atmosphere, and means for reciprocating the sleeve at predetermined intervals to alternately carry the peripheral opening of the inner valve member and the longitudinal groove into alinement with the spray head pipe opening, as and for the purpose specified.

3. In a control device for spray heads for air washers, a valve comprising an outer cylindrical member having a water inlet at one end, a peripheral opening, a spray head supply pipe secured in the opening, and a peripheral opening leading to the atmosphere, an inner cylindrical member open at the end in alinement with the inlet opening of the outer cylinder, a peripheral opening in circumferential alinement with the spray head pipe opening, and a longitudinal groove normally connecting the spray head pipe opening with the opening leading to the atmosphere, and hydraulic means for reciprocating the sleeve at predetermined intervals to alternately carry the peripheral opening of the inner valve member and the longitudinal groove into alinement with the spray head opening, as and for purpose specified.

4. In a control for spray heads for air washers, the combination with a valve comprising an outer casing having an inlet opening at one end, and a peripheral opening provided with a spray head supply pipe, and an opening leading to the atmosphere, an inner cylindrical member having an open end in alinement with the supply opening of the outer casing, a peripheral opening in circumferential alinement with the opening leading to the spray heads and a groove normally connecting the opening leading to the spray heads with the opening leading to the atmosphere, a tilting pan, a lever carried by the cylindrical member of the valve, a link connected to one end of the tilting pan, an adjustable connection between said link and lever, and a counter-weight at the opposite end of the pan for returning the pan to normal position.

In testimony whereof I have signed my name to this specification in the presence of two witnesses.

SIDNEY RANDOLPH SHELDON.

Witnesses:
ROBERT DONALDSON,
J. A. STEPHENSON.